3,022,489
MEANS AND TECHNIQUES FOR INDICATING THE RATIO OF TWO VARIABLES OR THE RECIPROCAL OF ONE VARIABLE
Richard H. Huddleston, Jr., Houston, Tex., assignor to Halliburton Company, a corporation of Delaware
Filed Mar. 17, 1959, Ser. No. 799,981
10 Claims. (Cl. 340—15)

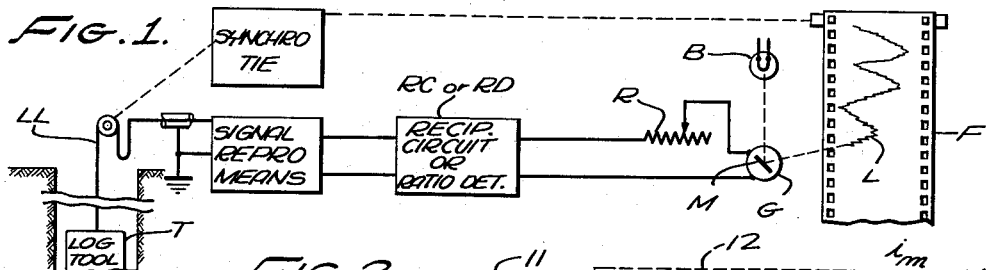
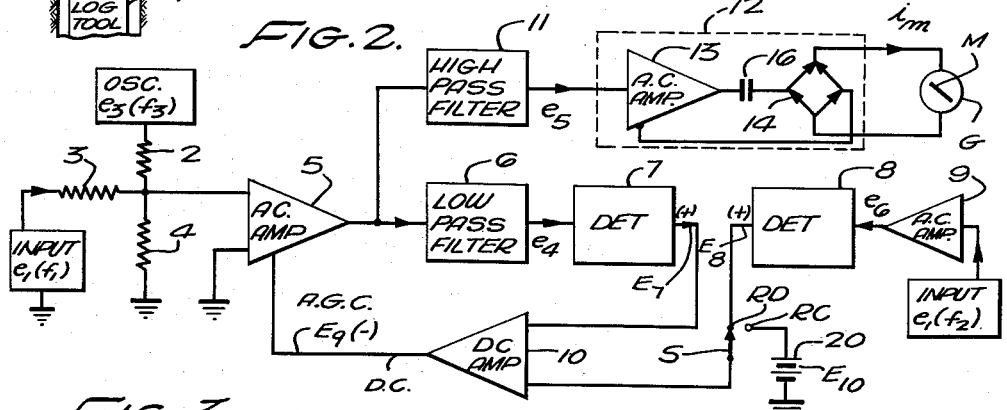
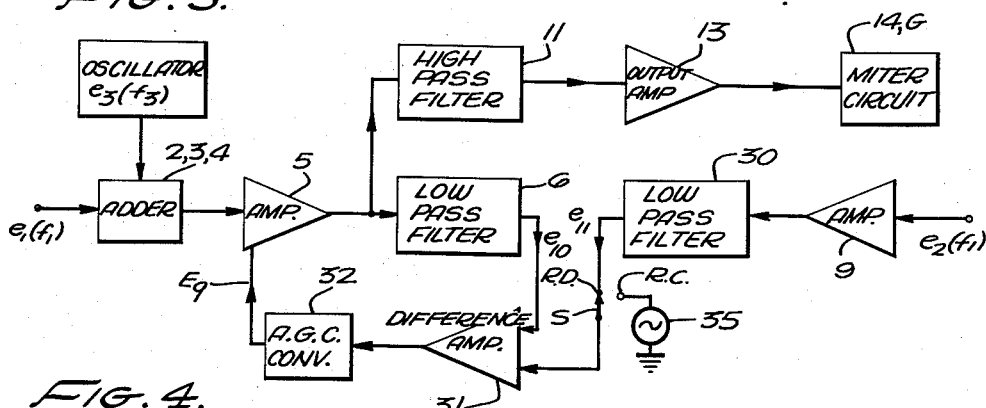
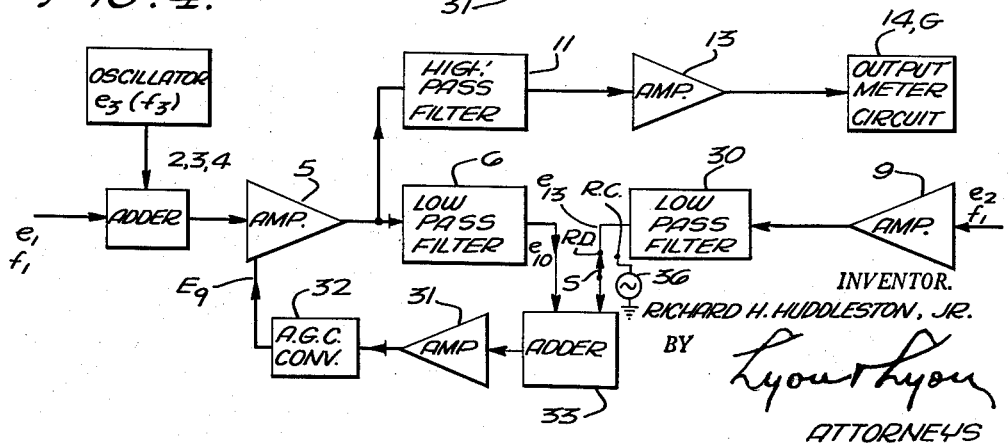
INVENTOR.
RICHARD H. HUDDLESTON, JR.
BY
ATTORNEYS United States Patent Office 3,022,489
Patented Feb. 20, 1962

The present invention relates to improved means and techniques for deriving from a first varying electrical quantity, a second electrical quantity which is an indication of the mathematical reciprocal of the first quantity or for indicating the ratio of two varying electrical quantities; and the present invention is particularly useful in well bore logging equipment wherein it is desired to record logging information, otherwise recordable in the form of a conductivity log, in the form of a resistivity log or vice versa or, in other cases, to indicate the ratio of two varying electrical quantities, one of which is representative of formation current and the other one of which is representative of formation voltage to thereby derive an indication either of formation conductivity or of formation resistivity.

In some forms of well logging operations as, for example, in induction well logging where the effect of magnetically induced eddy currents in earth formations on a receiver coil are measured or indicated, the indications or measurements made vary in substantially direct proportion to the current flowing in the earth formations under investigation. This means that a plot of such indications or measurements with respect to the position of the logging tool in the well bore results in a conductivity-type log, as distinct from a resistivity-type log, since conductivity, in accordance with Ohm's Law, is equal to $$\frac{I}{E}$$

where I is the formation current and E is the voltage causing such current flow in the formations. In other words, the term I is in the numerator of the above expression, and thus as I increases, the indicated or measured conductivity increases also in the same proportion. Usually in systems of this type of logging, the quantity E is assumed to be constant since usually a transmitter coil which causes the eddy currents is supplied with a constant current.

It is oftentimes desirable for many different reasons, for example, for comparison with other logs and for perhaps enhanced accuracy where formation conductivity is low, to convert these indications or measurements in such form as to obtain a resistivity log. This, in effect, involves the provision of means receptive to the incoming I signal and functioning to derive a second quantity which is in proportion to the inverse or mathematical reciprocal of I, i.e.

$$\frac{1}{I}$$

or $$\frac{K}{I}$$

where K is a constant, and then applying such second derived quantity to a recording galvanometer in which the movable element is deflected in accordance with the reciprocal of I in which case a resistivity log is obtained. It is understood, of course, that resistivity is the inverse or mathematical reciprocal of conductivity.

In other types of logging systems as, for example, in the various forms of electrical logging systems, the current flowing through the formations may be maintained constant and a resulting voltage drop is indicated. In such case a recording of the voltage drop results in a resistivity-type log, since as the resistivity increases, the indicated or measured voltage drop increases also. Instead or recording indications of such voltage drop directly for purposes of obtaining a resistivity-type log, it is oftentimes desirable to record a conductivity-type log; and in such case, the same form of means alluded to above is first used to obtain an inversion or reciprocation of a signal prior to recording.

Further, in other forms of logging systems the conductivity or resistivity is computed in terms of the ratio of two varying electrical quantities, one of which is representative of formation current and the other one of which is representative of formation voltage and the present invention is adaptable also for determinations of such ratio.

It is therefore an object of the present invention to provide improved means and techniques of the character indicated above whereby either conductivity or resistivity-type logs may be produced from information which otherwise, when recorded, would be in the form of a different type log, and also whereby the ratio of two varying electrical quantities may be computed by a simple conversion of such means.

Another object of the present invention is to provide an improved reciprocating circuit or ratio detector for these purposes, characterized in that the same has a large dynamic range, i.e. has the capability of producing accurate results over a large range of input signals corresponding either to I or E, or to both a varying E and I, as the case may be.

Another object of the present invention is to provide an improved inverting or reciprocating circuit for these purposes in which problems of damping and sensitivity are not critical for maintenance of response speed, resolution and stability, as in the case of prior art arrangements such as, for example, in computing servomechanisms.

Another object of the present invention is to provide improved means and techniques for these purposes which are devoid of mechanical components that require considerable space and operating power.

Another object of the present invention is to provide improved means and techniques for these purposes which do not require the use of moving parts such as, for example, slidewires which are subject to deterioration and wear in use and are thus a potential source of error and failure.

Another object of the present invention is to provide means and techniques for these purposes which do not rely on characteristics or accuracy of non-linear devices.

Another object of the present invention is to provide improved means and techniques for these purposes characterized by the fact that the same involves a self-balancing, all electronic system.

Another object of the present invention is to provide an improved system of this character featured by its large dynamic range, its fast response to variations in the input signal or signals, its reduced space and power requirements, and one which may be transistorized if desired.

Another object of the present invention is to provide an improved system of this character which is easy to instrument with accuracy.

Another object of the present invention is to provide an improved ratio detector.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates well bore logging systems embodying features of the present invention.

FIGURE 2 illustrates details of the Reciprocating Circuit or Ratio Detector indicated as such embodying features of the present invention and indicated as such in the generalized systems illustrated in FIGURE 1.

FIGURES 3 and 4 illustrate different modified apparatus, also embodying features of the present invention.

FIGURE 1 illustrates generally well bore logging systems in which the present invention is particularly useful. A log L, either of the conductivity or resistivity type, as the case may be, is produced on a photographic film F which is driven in timed relationship with movement of the logging tool T when and as the same is moved in the well bore past the various earth formations traversed by such well bore. This relationship between movement of the logging tool T and film F is indicated generally by the Synchro Tie in FIGURE 1 which indicates a means whereby the film F is moved synchronously with the logging line LL, i.e. the logging tool T, and, of course, the particular means used for accomplishing this result involve well known and used techniques and hence the same need not be described specifically.

The logging tool T may be any one of the well known types and incorporates means whereby a signal or signals are developed which is an indication or a measure of a characteristic of the formations adjacent the logging tool. For example, in an induction logging system, the signal may be a voltage developed in a receiver coil in response to eddy currents induced in such formations, and thus be representative of formation conductivity; or in the case of an electrical logging system, the signal may be an indication of a voltage drop across the formations and thus be a measure of the formation resistivity. In other systems two varying signals may be produced and their ratio computed for determining resistivity or conductivity. In either case, the signal or signals are transmitted, using conventional means over the logging line LL to surface equipment which includes conventional signal reproducing means, indicated as such in FIGURE 1, for producing a signal or signals representative of the signal or signals developed in the logging tool T. The signal or signals, so reproduced and in representative form, are applied to the Reciprocating Circuit or Ratio Detector, RC or RD, and the output thereof is applied to the recording galvanometer G through an attenuator represented by adjustable resistance R if so desired. The galvanometer mirror M is thus deflected proportionately in accordance with the amplitude of the output signal developed in the RC or RD and serves to direct a beam of light from lamp bulb B onto film F to produce log L.

FIGURE 2 shows elements which are included in the block designated RC or RD in FIGURE 1 and the same are shown conditioned for operation as a Ratio Detector (R.D.), i.e. the switch S is shown in its R.D. position. This switch S, when in its other position designated R.C., conditions the system for operation as a reciprocating circuit. The circuit in FIGURE 2 is first described when operating as a Ratio Detector.

One input signal is represented as $e_1$ having a frequency $f_1$, and the same is understood to be obtained from the "Signal Reproducing Means" shown in FIGURE 1. This signal $e_1$ is considered to be an amplitude-modualted wave, i.e. a wave having a frequency $f_1$ modulated in amplitude in accordance with a signal derived from the logging tool.

A second input signal is represented as $e_2$ having a frequency $f_2$, and the same is also considered to be obtained from the "Signal Reproducing Means" shown in FIGURE 1. The signal $e_2$ is considered to be an amplitude-modulated wave, i.e. a wave having a frequency $f_2$ modulated in amplitude in accordance with a second signal derived from the logging tool. While FIGURE 2 shows input signals of different frequency $f_1$ and $f_2$, in order to demonstrate the fact that the two frequencies need not be identical, the system as described will operate when the two input signals have the same frequency.

The signals $e_1$ and $e_2$ may be considered to be denominator and numerator signals respectively or vice versa. For present discussions, $e_1$ is considered to be the denominator signal and $e_2$ the numerator signal.

This $e_1$ signal is combined with an $e_3$ reference or carrier signal of constant amplitude and constant frequency $f_3$ supplied from oscillator 1 in an adding or adder network comprising resistances 2, 3 and 4, and such combined signal $e_1$, $e_3$ appearing across resistance 4 is applied to the input terminals of amplifier 5 having its gain controlled as described later by an automatic gain control signal $E_9$. It is understood, for present purposes, that the frequency $f_1$ is much less than the frequency $f_3$.

The output of amplifier 5 comprising the amplified $f_1$ and $f_3$ signals is separated according to these frequencies $f_1$ and $f_3$ by means of the low-pass filter 6 and high-pass filter 11.

The low frequency signal (corresponding to $f_1$) after it has passed through the filter 6 is represented as $e_4$ and the same is converted to a unidirectional voltage by detector 7 having its output represented by $E_7$, a D.C. voltage, while the high frequency signal (corresponding to $f_3$) after appearing as $e_5$ in the output of filter 11 is converted to a meter reading of galvanometer G corresponding to the current $i_m$ by means of converter 12.

The numerator signal $e_2$ is applied to the input terminals of amplifier 9 and its output signal $e_6$ is converted to a unidirectional signal $E_8$ in the output circuit of detector 8. The two signals $E_7$ and $E_8$ may be considered to have the same polarity as indicated and the same are applied to input terminals of the D.C. amplifier 10 for comparison and for the production of an amplified output signal $E_9$ which is in the form of a difference or error signal. This latter signal from amplifier 10 in amplified form is applied to the A.C. amplifier 5 to control its gain. This signal $E_9$ is of the correct polarity to change the gain of amplifier 5 such that the D.C. signal voltage $E_7$ is made virtually equal, at all times, to the D.C. signal voltage $E_8$.

As demonstrated perhaps more clearly below, the gain of amplifier 5 is thus a function of $$\frac{e_2}{e_1}$$

To facilitate measurement of this quantity, the reference signal $e_3$, having a constant amplitude, also passes through amplifier 5. The amplifier signal $e_5$ is then proportional to the gain of amplifier 5 and to the ratio $$\frac{e_2}{e_1}$$

For convenience, a typical converter (meter amplifier) 12 converts the A.C. signal to D.C. for recording by galvanometer G, which is considered to be a current-measuring means.

This converter 12 may, for example, include an A.C. amplifier 13 to which the signal $e_5$ is applied with the output of such amplifier being applied through condenser 16 to a full wave bridge network 14, the output of such bridge network in the form of current $i_m$ being applied to the meter or galvanometer G.

The amplifier 5 may be of any type having controllable gain, such as, for example, those in which the bias level of pentode amplifiers is changed for changing transconductance, likewise transistor amplifiers may be used. Also, for this same purpose, non-linear resistance networks may be used, particularly when the same are incorporated in a bridge arrangement. For example, a dynamic range of 1,000 to 1 may be obtained using an amplifier 5 which includes three pentode stages comprising 6CL6 type tubes. Because of the use of this self-balancing principle of operation, the system is thus easily instrumented.

It will be seen from the above discussion that when $f_1$ is much less than $f_3$, $E_7$ minus $E_8$ is equal to zero as intended and low-pass filter 6 has zero insertion loss, the following relations are true:

$$E_7 = A_5 D_7 S_1 e_1$$

where $E_7$ is the D.C. converted denominator signal, $A_5$ is the gain of amplifier 5, $D_7$ is the conversion gain of detector 7 which is constant, $S_1$ is a constant and is a function of summing resistances 3 and 4, and $e_1$ is the denominator signal. Also, $$E_8 = A_9 D_8 e_2$$

where $E_8$ is the D.C. converted numerator signal, $A_9$ is the gain of amplifier 9 which is a constant, $D_8$ is the conversion gain of detector 8, a constant, and $e_2$ is the numerator signal.

Since $E_7$ is equal to $E_8$, it can be shown that $$A_5 = \frac{e_2}{e_1} \frac{A_9 D_8}{D_7 S_1}$$

and that $i_m$ is equal to a constant times $$\frac{e_2}{e_1}$$

Thus, the current indicated or measured by the meter or galvanometer G is proportional to the ratio of the two input signals $e_2$ and $e_1$.

The system shown in FIGURE 2 is converted to a reciprocating circuit by simply actuating the switch S to its R.C. position in which case the varying signal $E_8$ is now replaced in the system by a constant voltage $E_{10}$ represented by the voltage source 20. The system operates otherwise as described above, the only difference being that $E_7$ is now compared with a constant voltage $E_{10}$ representing a constant numerator instead of a varying signal $E_8$ representing a varying numerator. It is thus clear, in this case, that the current $i_m$ is then a measure of the reciprocal of the denominator signal $e_1$.

The system shown in FIGURE 2 may be modified as shown in FIGURES 3 and 4 when the two input signals have the same frequency and the same phase. In such case it is not necessary to use converters or detectors 7 and 8 but A.C. signals instead of D.C. signals are compared. Corresponding elements in FIGURES 2, 3 and 4 are designated with identical reference numerals and captions to avoid a repetitious description.

In FIGURE 3 the amplified output signal from A.C. amplifier 9 is first preferably subjected to a low-pass filter 30 identical with filter 6 for the purposes of assuring the preservation of phase relations between the filter output voltages $e_{10}$ and $e_{11}$ which are compared in the input circuit of the difference A.C. amplifier 31. The difference in $e_{10}$ and $e_{11}$ is amplified and then applied to the A.G.C. converter 32 which develops the D.C. voltage $E_9$ for controlling the gain of amplifier as described above to, in this case, maintain the difference between $e_{10}$ and $e_{11}$ substantially zero.

FIGURE 4 shows a slight variation of FIGURE 3 in that the two signals $e_{10}$ and $e_{13}$ from the output of filters 6 and 30 respectively are now added in the adder stage 33 before their difference is established in the input circuit of difference amplifier 31. This arrangement in FIGURE 4 is useful when the original signal $e_{11}$ of FIGURE 3 is of reverse polarity represented by signal $e_{13}$ in FIGURE 4.

In accordance with the above description of FIGURE 2, the systems of FIGURES 3 and 4 may be converted from systems for detecting ratios of $$\frac{e_2}{e_1}$$

to reciprocating systems by actuating the switch S to the R.C. position wherein the constant A.C. voltage sources 35 and 36 of proper phase then replace corresponding varying voltages $e_{11}$ and $e_{13}$, and the meter circuits 14, G, in FIGURES 3 and 4 then read, indicate or measure the reciprocal of the amplitude of the input signal $e_1$.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a well logging system, means producing a logging signal which is indicative of a characteristic of an earth formation within a well bore, a source of a reference signal, said logging signal and said reference signal being of varying character with the frequency of the reference signal being greater than the variations in said logging signal, a common signal transmission channel coupled to said signal producing means and said reference source for transmitting said logging signal and said reference signal therethrough, high-pass filter means having its input coupled to the output of said channel and effective to pass only said reference signal, indicating means coupled to the output of said filter for indicating said reference signal as a function of said characteristic in correlation with the depth of said formation within said well bore, low-pass filter means having its input coupled to said channel for passing only said logging signal, and means coupled between the output of the last-mentioned filter means and said channel for controlling a transmission characteristic of said channel.

2. A system as set forth in claim 1 including a source of voltage, and means comparing the output of the last-mentioned filter means with the voltage from said source of voltage and controlling said channel in accordance with the comparison.

3. A system as set forth in claim 1 including means for producing a second logging signal correlated with the first mentioned logging signal, second low-pass filter means through which said second logging signal is transmitted, and the output of the last mentioned filter means is compared with the output of the first-mentioned low-pass filter means for controlling a transmission characteristic of said channel.

4. In a system for logging well bores, the combination comprising, means producing a logging signal indicative of a characteristic of an earth formation within a well bore, means producing a carrier signal, means producing a reference signal, a variable gain amplifier receiving said carrier signal and said logging signal and transmitting a composite signal including said logging signal and said carrier signal, means receiving said composite signal and producing a segregated logging signal and a segregated carrier signal, control means receiving said segregated logging signal and said reference signal and varying the gain of said amplifier in response to the respective magnitudes of said segregated logging signal and said reference signal, and means receiving said segregated carrier signal from said receiving means and indicating the magnitude of said carrier signal as a function of a characteristic of said earth formation in correlation with the depth of said earth formation within said well bore.

5. The system of claim 4 wherein said carrier signal and said logging signal are of different frequency.

6. In a system for logging well bores, the combination comprising, means producing a first and a second logging signal indicative of a characteristic of an earth formation within a well bore, means producing a carrier signal, a variable gain amplifier receiving said carrier signal and said first logging signal and transmitting a composite signal including said first logging signal and said carrier signal, means receiving said composite signal and producing a segregated logging signal and a segregated carrier signal, control means receiving said segregated logging signal and said second logging signal and varying the gain of said amplifier in response to the respective magnitudes of said segregated logging signal and said second logging signal, and means receiving said segregated carrier signal from said receiving means and indicating said carrer signal as a function of a characteristic of said earth formation in correlation with the depth of said earth formation within said well bore.

7. In a system for logging well bores, the combination comprising, means producing a first and a second logging signal indicative of a characteristic of an earth formation within a well bore, means producing a carrier signal, means producing a reference signal, a variable gain amplifier receiving said carrier signal and said first logging signal and transmitting a composite signal including said first logging signal and said carrier signal, means receiving said composite signal and producing a segregated logging signal and a segregated carrier signal, switching means coupling one of said second logging signal or said reference signal to a control means, said control means receiving said segregated logging signal and said one of said second logging signal or said reference signal and varying the gain of said amplifier in response to their respective magnitudes, and means receiving said segregated carrier signal from said receiving means and indicating said carrier signal as a function of a characteristic of said earth formation in correlation with the depth of said earth formation within said well bore.

8. In a method for obtaining an indication of a characteristic of an earth formation traversed by a well bore, the steps comprising, producing a logging signal indicative of a characteristic of said earth formation, producing a carrier signal, transmitting said first logging signal and said carrier signal through a transmission channel having a variable gain in amplification to produce a composite signal including said first logging signal and said carrier signal, receiving said composite signal and producing a segregated logging signal and a segregated carrier signal, receiving said segregated logging signal, controlling the gain of said transmission channel in response to the value of said segregated logging signal, and indicating said segregated carrier signal in correlation with the depth of said earth formation as a function of said characteristic.

9. In a method obtaining an indication of a characteristic of an earth formation traversed by a well bore, the steps comprising, producing a first and a second logging signal indicative of a characteristic of said earth formation, producing a carrier signal, transmitting said first logging signal and said carrier signal through a transmission channel having variable amplification to produce a composite signal including said first logging signal and said carrier signal, receiving said composite signal and producing a segregated logging signal and a segregated carrier signal, receiving said segregated logging signal and said second logging signal, controlling said transmission characteristic in response to the respective values of said segregated logging signal and said second logging signal, and receiving and indicating said segregated carrier signal in correlation with the depth of said earth formation as a function of said characteristic.

10. In a method obtaining an indication of a characteristic of an earth formation traversed by a well bore, the steps comprising, producing a first and a second logging signal indicative of a characteristic of said earth formation, producing a carrier signal, producing a reference signal, transmitting said first logging signal and said carrier signal through a transmission channel having variable amplification to produce a composite signal including said first logging signal and said carrier signal, receiving said composite signal and producing a segregated logging signal and a segregated reference signal, receiving said segregated logging signal and an alternate one of said second logging signal of said reference signal, controlling the amplification of said channel in response to the values of said segregated logging signal and said one received second logging signal or reference signal, and indicating said transmitted carried signal in correlation with the depth of said earth formation as a function of said characteristic.

References Cited in the file of this patent

UNITED STATES PATENTS

| | | |
|---|---|---|
| 2,400,326 | Wolf | May 14, 1946 |
| 2,481,492 | Bjarnason | Sept. 13, 1949 |
| 2,497,883 | Harris | Feb. 21, 1950 |
| 2,682,366 | Burgett | June 29, 1954 |